United States Patent [19]

Hosokawa et al.

[11] Patent Number: 4,464,711
[45] Date of Patent: Aug. 7, 1984

[54] GATE PULSE PHASE SHIFTER

[75] Inventors: Yasuhiko Hosokawa; Shunichiro Onishi, both of Hyogo, Japan

[73] Assignee: Mitsubishi Denki Kabushiki Kaisha, Tokyo, Japan

[21] Appl. No.: 379,540

[22] Filed: May 18, 1982

[30] Foreign Application Priority Data

May 19, 1981 [JP] Japan .................................. 56-75948

[51] Int. Cl.³ .......................................... H02P 13/24
[52] U.S. Cl. ................................ 363/87; 367/252 N; 363/129
[58] Field of Search ...................... 363/84, 85, 87, 128, 363/129; 307/252 R, 252 N

[56] References Cited

U.S. PATENT DOCUMENTS 4,164,015  8/1979  Espelage et al. ....................... 363/87

FOREIGN PATENT DOCUMENTS 51416   5/1982  European Pat. Off. ............ 363/129
843147  6/1981  U.S.S.R. .............................. 363/129

OTHER PUBLICATIONS

"Generation of Gate Trigger Pulses for an SCR Controlled 3-Phase Bridge Rectifier", H. N. Shiuashankar, N. Bhaskora Rao, J. Inse. Engr. (India), vol. 62, Dec. 1981, pp. 33-35.

Primary Examiner—William M. Shoop
Attorney, Agent, or Firm—Sughrue, Mion, Zinn, Macpeak and Seas

[57] ABSTRACT

A gate pulse phase shifter is designed so as to generate pulses at intervals of 60° regardless of distortions in the AC power supply voltage, and so that, for linearity in control, the phase reference signal and the DC output voltage of AC-DC converters connected to the device are proportionally related.

7 Claims, 5 Drawing Figures

GATE PULSE PHASE SHIFTER

BACKGROUND OF THE INVENTION

This invention relates to a gate pulse phase shifter or, more particularly, to a gate pulse phase shifter for controlling the phase of a gate pulse impressed on an AC-DC converter constituted, for example, of a thyristor.

FIG. 1 is a block diagram representing a conventional gate pulse phase shifter. In FIG. 1, a synchronizing power input terminal 1 is supplied with a synchronizing AC supply voltage $V_{AC}$. A voltage detector 2 detects a voltage of the synchronizing supply voltage $V_{AC}$. A phase difference detector 3 compares the phase of the output of the voltage detector 2 with the phase of an output of a ring counter 4 and generates an output according to the phase difference. A voltage control oscillator 5 zeroes the difference between the phase of the output of the voltage detector 2 and that of the output of the ring counter 4 by changing an oscillation frequency according to the output of the phase difference detector 3. A frequency divider 6 divides the oscillation frequency of the voltage control oscillator 5 to impress the same on the ring counter 4. The ring counter 4 counts the output pulse number impressed thereon by the frequency divider 6 and generates six outputs U–Y each shifted 60 degrees in phase from the others, and thus a phase synchronous circuit 7 is formed by the phase difference detector 3, ring counter 4, voltage control oscillator 5 and frequency divider 6.

Pulse generators (8U)–(8Y) generate gate pulses for six thyristors (not illustrated) consituting an AC-DC converter (not illustrated) via output terminals (9U)–(9Y), with the oscillation frequency of the voltage control oscillator 5 as clock pulses and the output signals U–Y of the ring counter 4 as reset pulses, respectively, for binary counters (801U)–(8014). The counters are phase angle specifying devices counting the oscillation frequency of the voltage control oscillator 5 as a clock pulse and resetting a discrete value to 0 with the output signals U–Y of the ring counter 4 as reset pulses. Digital-analog converters (hereinafter referred to as "D-A converters") (802U)–(802Y) convert a digital value, i.e. a discrete value of the binary counters (801U)–(801Y) into an analog value, and comparators (803U)–(803Y) compare this value with a phase reference signal $E_C$ input via a phase signal input terminal (10). The comparators generate an output when both these values coincide with each other.

The operation of the above device will now be described with reference to FIG. 2. The phase synchronous circuit 7 synchronizes the phase of an output of the ring counter 4 with the phase of the synchronizing supply voltage $V_{AC}$ input via the synchronizing supply input terminal 1. When there is a differenc between the phase of the output of the voltage detector 2 and the phase of the output of the ring counter 4, the phase difference detector 3 generates an output corresponding to the phase difference to change the oscillation frequency of the voltage control oscillator 5, thereby zeroing said phase difference.

In this case, if the frequency of the synchronizing supply voltage $V_{AC}$ is represented by f, the frequency dividing ratio of the frequency divider 6 is R, and the frequency dividing ratio of the ring counter 4 is 6, the oscillation frequency $f_{osc}$ of the voltage control oscillator 5 is given by $f_{osc} = 6 \times R \times 7$. The six output signals U–Y of the ring counter 4 have a phase difference of 60 degrees each, as shown in U–Y of FIG. 2 at (4), and the rise time of each output signal U–Y indicates the gate pulse phase in the case where a control angle of lag $\alpha$ output to the six thyristors (not illustrated) is 0 degrees. As indicated by the dotted line in FIG. 2 at (4), the output signal U is synchronized in frequency and phase with the synchronizing supply voltage $V_{AC}$, and repeats the outputs 0, 1 every 180 degrees.

Discrete values of the binary counters (801U)–(801Y) are reset at the rise time of the output signals U–Y. The binary counters (801U)–(801Y) are of n bits and have n, and R set to satisfy $2^n \geq 6R$. Namely, the reset pulses representing the output signal U–Y of the ring counter 4 output at each cycle of the synchronizing supply voltage $V_{AC}$ come in before the binary counters (801U)–(801Y) count from 000 ... 0 up to 111 ... 1, and the binary counters (801U)–(801Y) are then reset to 000 ... 0 to commence counting anew.

The discrete values of the counters are converted into analog values by the D-A converters (802U)–(802Y), and the outputs of the D-A converters are synchronized, as shown in U–Y of FIG. 2 at (802), with the synchronizing supply voltage $V_{AC}$, and are turned into sawtooth waves having a phase difference of 60 degrees each. These sawtooth waves, which are the outputs of the D-A converters (802U)–(802Y), rise at the time of the control angle of lag $\alpha = 0$ to the six thyristors (not illustrated), increases until the time $\alpha = 360$ degrees and then return to 0. The sawtooth waves are compared with the phase reference signal $E_C$ input via the phase signal input terminal 10 by the comparators (803U)–(803Y), and when both coincide, as shown in FIG. 2 at (802), output pulses are generated at the output terminals (9U)–(9Y) as shown in (9U)–(9Y) of FIG. 2. These output pulses are generated at the control angle of lag $\alpha = 0$ when the phase reference signal $E_C$ is 0, and the lag $\alpha$ increases in accordance as the phase reference signal level $E_C$ becomes larger.

Thus in the conventional device, since the output pulses are generated at the output terminals (9U)–(9Y), the phase of the synchronizing supply voltage $V_{AC}$ is not used directly, but the phase of the voltage control oscillator 5 produced by the phase synchronous circuit 7 and synchronized with the synchronizing supply voltage $V_{AC}$ is used. Therefore the output pulses are generated at output terminals (9U)–(9Y) at intervals of 60 degrees at all times, without being influenced by distortions in the synchronizing supply voltage $V_{AC}$.

In the conventional device, however, the phase reference signal $E_C$ and the control angle of lag $\alpha$ are proportionally related to one another. On the other hand, the DC output voltage of the AC-DC converters (not illustrated) using output pulses of the output terminals (9U)–(9Y) as gate pulses is, as well known, proportional to cos $\alpha$. Therefore, insofar as the output pulses at the output terminals (9U)–(9Y) generated by the conventional device are used as gate pulses for the AC-DC converters (not illustrated), the phase reference signal $E_C$ is not proportional to the DC output voltage of the AC-DC converters.

As a result, in the case where the DC output voltage of the AD-DC converters is used for control, or where the DC output current is subjected to feedback control, the control system becomes nonlinear and lacks good control response, and moreover, the selection of the control constant becomes complicated.

SUMMARY OF THE INVENTION

The object of this invention is to remove the above defect prevailing hitherto, and provide a gate pulse phase shifter allowing the phase reference signal $E_C$ and the DC output voltage of the AC-DC converters to be proportionally related, and generating pulses at intervals of 60 degrees at all times without being influenced by distortions in the synchronizing supply voltage $V_{AC}$.

DETAILED DESCRIPTION OF THE PREFERRED EMBODIMENTS

Figure 1:
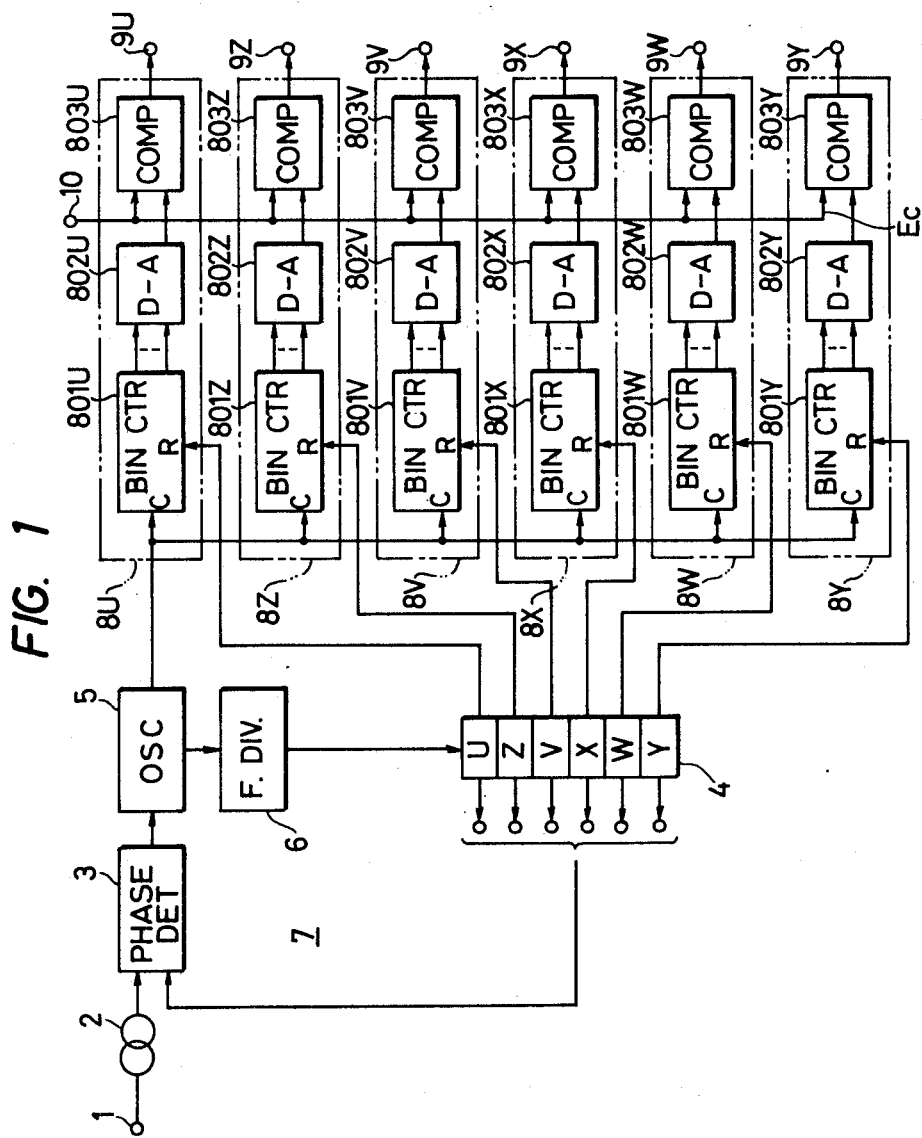
FIG. 1 is a block diagram representing a conventional gate pulse phase shifter.
Figure 2:
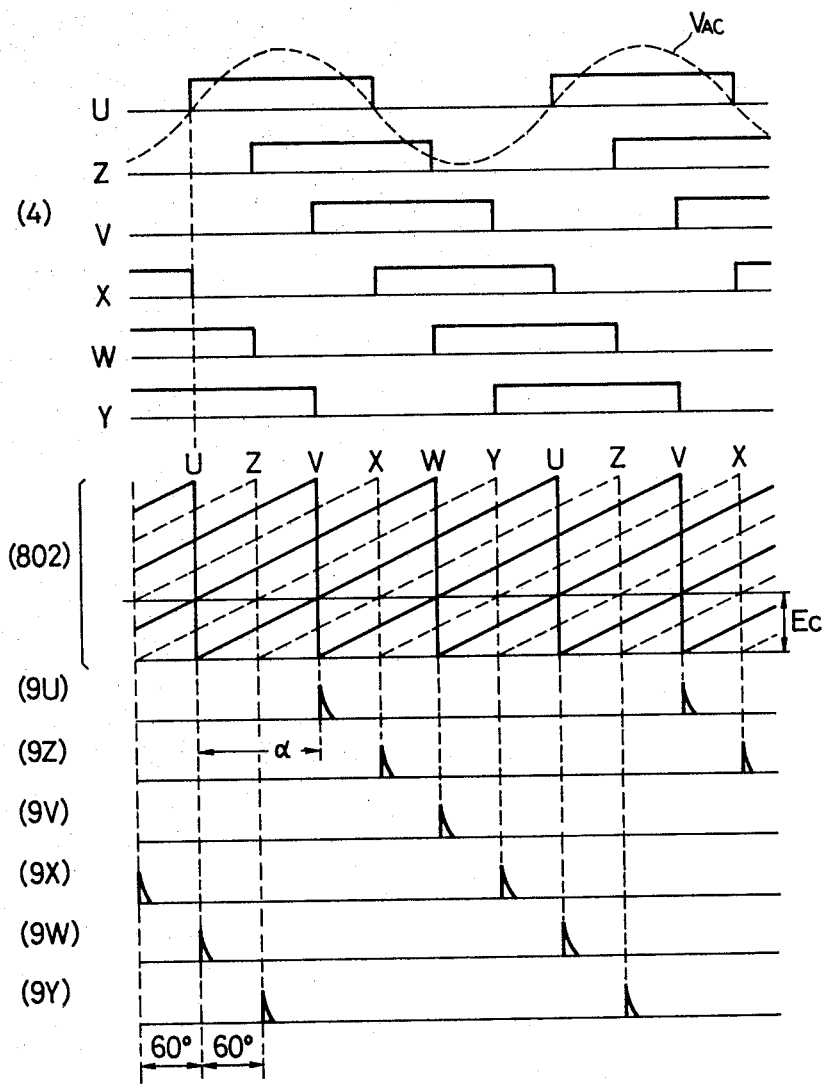
FIG. 2 is an explanatory drawing showing the operation of FIG. 1.
Figure 3:
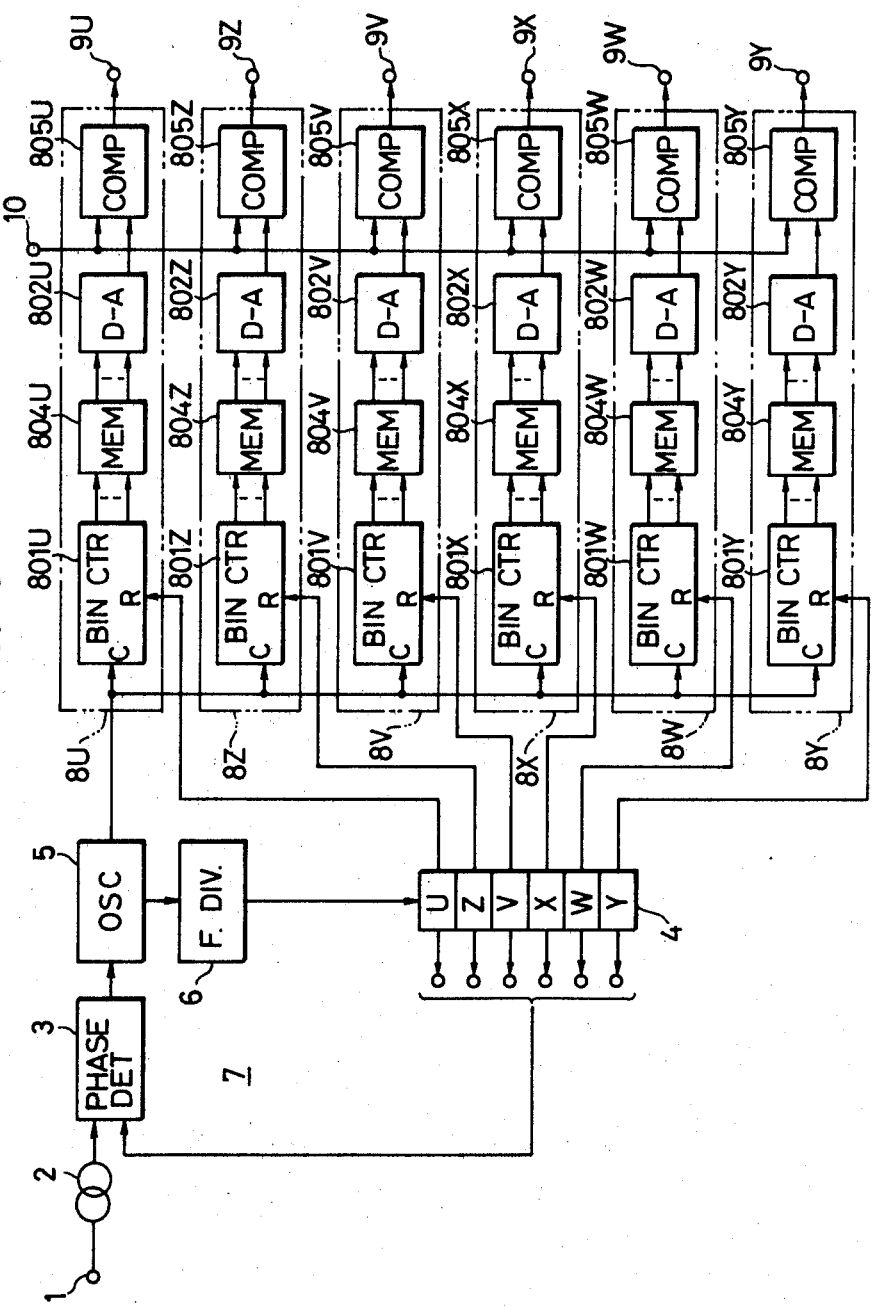
FIG. 3 is a block diagram representing one preferred embodiment of a gate pulse phase shifter according to the invention.
Figure 4:
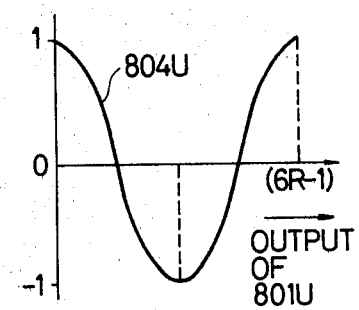
FIG. 4 and FIG. 5 are explanatory drawings showing the operation of the device of FIG. 3.

In FIG. 3, like symobols refer to like parts of FIG. 1. In FIG. 3, memory devices (804U)–(804Y) are, for example, read-only memories having a memory address on the ordinate axis and a voltage on the quadrature axis, the voltage being stored in each memory address as a digital value of a cosine wave form. The memory address is specified by each output of the binary counters (801U)–(801Y), and the voltage in the specified address is read out as a digital value. Thus, the output of memory 804U is as shown in FIG. 4, as a whole. Comparators (805U)–(805Y) compare the outputs of the memory devices (804U)–(804Y), which are converted into analog values via D-A convertors (802U)–(802Y), with a phase reference signal $E_C$ from the phase signal input terminal 10, and generate an output pulse when the outputs of the D-A converters coincide with the phase reference signal $E_C$ from the high side, i.e. from a state wherein they are larger than the phase reference signal $E_C$. The comparators do not generate an output pulse when the outputs of the D-A converters (802U)–(802Y) coincide with the phase reference signal $E_C$ coming from the state wherein they are smaller than the phase reference signal $E_C$. The memory devices (804U)–(804Y) have 6R memory addresses from address 0 to address (6R−1), as shown on the quadrature axis of FIG. 4, and a value of the cosine wave cos α corresponding to the control angle of the lag α when the address is specified, is stored in these memory elements. For example, a numerical value corresponding to the value of cos (60°×J÷R) is stored in address J.

Figure 5:
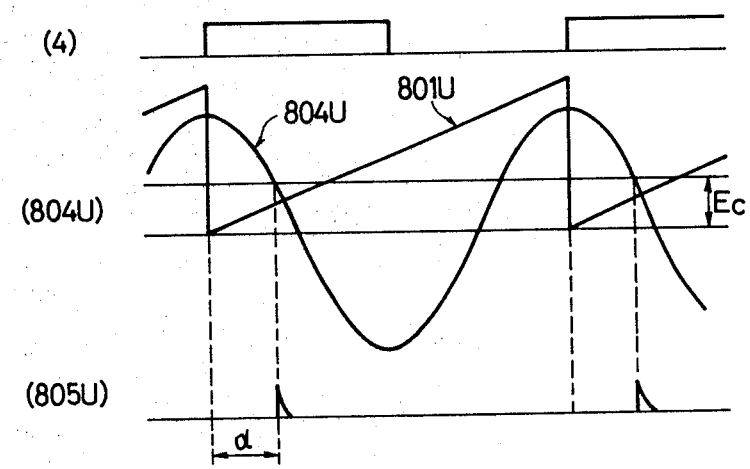

The operation of the device will now be described with reference to FIGS. 4 and 5. Since the oscillation frequency $f_{osc}$ of the voltage control oscillator 5 is 6R times the frequency f of the supply voltage $V_{AC}$ as described above, the binary counters (801U)–(801Y) receive 6R clock pulses from the voltage control oscillator 5 during the time before the next reset signals from the ring counter 4 are received, thus advancing the discrete value thereof from 0 to (6R−1). As the discrete value advances, all of the addresses from 0 to (6R−1) are specified in each memory device (804U)–(804Y) in sequence correspondingly to the discrete value. Namely, since the contents shown in FIG. 4 are stored in each memory device (804U)–(804Y), the values read out from the memory devices (804U)–(804Y) change successively in accordance with the discrete value of the binary counters (801U)–(801Y) as they ascend in a sawtooth wave form as shown in (801U) of FIG. 5, and an output in the form of the cosine wave cos α is read out in sequence as shown in (804U) of FIG. 5. The output of the memory devices (804U)–(804Y) is converted into an analog value through D-4 converters (802U)–(802Y) and then impressed on the comparators (805U)–(805Y). The comparators (805U)–(805Y) generate an output pulse, as shown in (805U) of FIG. 5, when the output of the D-A converters (802U)–(802Y) coincides with the phase reference signal $E_C$ when coming from the state wherein it is larger than the phase reference signal $E_C$. Thus an angle from the time whereat the binary counters (801U)–(801Y) receive reset pulses to that at which said output pulse is generated is the control angle of lag α, the same as in the case of the conventional device. As will be apparent from FIG. 5, the output of the memory devices (804U)–(804Y) is equalized with cos α. Therefore, the relation $E_C=\cos α$ will be realized between the phase reference signal $E_C$ and the control angle of lag α. The reverse will take place such that the pulse generators (8U)–(8Y) will geneate pulses at the time $E_C=\cos α$. On the other hand, it is generally known that a no-load DC output voltage $E_{DC}$ of the AC-DC converter (not illustrated) is a function of the input voltage $E_{AC}$ and the lag α, having the relation $E_{DC}=1.35 E_{AC}\cos α$. The relation $E_{DC}=1.35 E_{AC}E_C$ is obtainable through substituting the above-mentioned relation for said expression. The input voltage $E_{AC}$ is generally considered to be constant, therefore $E_{DC}$ and $E_C$ are completely proportional to each other. Thus, as in the case of the conventional device, the device according to this invention is capable of obtaining a gate pulse at intervals of 60 degrees at all times without being influenced by distortions in the supply voltage $E_{AC}$. In FIG. 5, (4) represents the state wherein the output signal U from the ring counter 4 is impressed on the reset input terminal R of the binary counter (801U).

Further, in the above embodiment, the cosine wave cos α from 0 to 360 degrees is stored, as shown in FIG. 4, in the memory devices (804U)–(804Y), however, the portion effective to generate the gate pulse actually impressed on the AC-DC converter (not illustrated) is that from 0–180 degrees, as will be apparent from FIG. 5. Therefore the cosine wave cos α from 0 to 180 degrees only will suffice for storage in the memory devices (804U)–(804Y). Further, in case the phase of the supply voltage $E_{AC}$ is shifted, the sine wave sin α can be stored, with the phases of the wave forms of the memory devices (804U)–(804Y) each shifted. Furthermore, when the phase reference signal $E_C$ from the phase signal input terminal 10 is a digital signal, digital comparators can be used for the comparators (805U)–(805Y), and the D-A converters (802U)–(802Y) can be omitted.

As described, according to this invention, the gate pulse is generated so that the phase reference signal and the DC voltage of the AC-DC converters will be proportionally related, and therefore nonlinearlity in the control system is eliminated, the control response can be improved, and the selection of the constant of the control system can be effectively simplified.

What is claimed is:

1. A gate pulse phase shifter, comprising; means for specifying a phase angle for a signal synchronous with the frequency and phase of an AC supply, memory means connected to said phase angle specifying means and having a plurality of addresses, said addresses being specified in sequence by the output of said phase angle specifying means correspondingly to said phase angle, said memory means storing numerical values corresponding to a cosine or sine value at a phase corresponding to said phase angle in a memory element of each address, and comparator means for comparing an output value of said memory means with a phase reference signal and for selectively generating a gate pulse when both coincide.

2. The gate pulse phase shifter as defined in claim 1, said phase angle specifying means comprising binary counter means, said binary counter means counting a clock pulse synchronized with said AC supply, said counter means being reset by a reset pulse synchronized with said AC supply and impressed at an integral number of half cycles of said AC supply.

3. The gate pulse phase shifter as defined in claims 1 or 2, wherein said numerical values correspond sequentially to cosine or sine values from 0 to 360 degrees and are stored in said memory means at sequential addresses thereof.

4. The gate pulse phase shifter as defined in claims 1 or 2, wherein said numerical values correspond sequentially to cosine or sine values from 0 to 180 degrees and stored in said memory means at sequential addresses thereof.

5. The gate pulse phase shifter as defined in claims 1 or 2, wherein said comparator means is digital, and said phase reference signal is a digital signal.

6. The gate pulse phase shifter as defined in claims 1 or 2, wherein said comparator means comprises analog comparator means, said phase reference signal is an analog signal, said phase shifter further including digital-analog converter means between said memory means and said comparator means.

7. The gate pulse phase shifter as defined in claim 1, wherein said comparator means generates said gate pulse only when said output value of said memory means is lowered to the value of said phase reference signal.

* * * * *